United States Patent [19]
Basuthakur et al.

[11] Patent Number: 6,003,817
[45] Date of Patent: Dec. 21, 1999

[54] ACTIVELY CONTROLLED THERMAL PANEL AND METHOD THEREFOR

[75] Inventors: Sibnath Basuthakur, Phoenix; David Paul Bonello, Chandler; Robert David Allen, Tempe, all of Ariz.

[73] Assignee: Motorola, Inc., Schaumburg, Ill.

[21] Appl. No.: 08/746,587

[22] Filed: Nov. 12, 1996

[51] Int. Cl.⁶ .............................. B64G 1/22; B64G 1/24
[52] U.S. Cl. .................... 244/158 R; 244/164; 244/170; 244/171; 244/172; 244/173; 244/168; 701/13; 701/3
[58] Field of Search ..................................... 244/164, 168, 244/170, 171, 173, 176, 195, 158 R, 1, 3; 701/13

[56] References Cited

U.S. PATENT DOCUMENTS

| | | | |
|---|---|---|---|
| 3,872,911 | 3/1975 | Janes | 160/1 |
| 4,325,124 | 4/1982 | Renner | 364/459 |
| 4,426,052 | 1/1984 | Hubert et al. | 244/168 |
| 4,591,116 | 5/1986 | Guenther et al. | 244/168 |
| 4,732,354 | 3/1988 | Lievre | 244/170 |
| 4,747,567 | 5/1988 | Johnson et al. | 244/173 |
| 4,759,517 | 7/1988 | Clark | 244/168 |
| 4,949,922 | 8/1990 | Rosen | 244/168 |
| 5,133,518 | 7/1992 | Flament | 244/173 |
| 5,149,022 | 9/1992 | Flament | 244/168 |
| 5,211,360 | 5/1993 | Zimbelman | 244/164 |
| 5,310,144 | 5/1994 | Salvatore et al. | 244/168 |
| 5,626,315 | 5/1997 | Flament et al. | 244/168 |
| 5,697,582 | 12/1997 | Suraueret al. | 244/168 |
| 5,775,645 | 7/1998 | Yocum, Jr. et al. | 244/168 |
| 5,816,540 | 10/1998 | Murphy et al. | 244/173 |
| 5,833,175 | 11/1998 | Caplin | 244/173 |

FOREIGN PATENT DOCUMENTS

| | | | |
|---|---|---|---|
| 9630259 | 10/1996 | WIPO | B64G 1/44 |

*Primary Examiner*—Jacques H. Louis-Jacques
*Assistant Examiner*—Yonel Beaulieu
*Attorney, Agent, or Firm*—Sherry J. Whitney; Dana B. LeMoine; Frank J. Bogacz

[57] ABSTRACT

One or more deployable thermal panels (24, 28, 70) are actively controlled throughout the orbit of a satellite (20) to provide thermal dissipation. Adjusting the incident angle between the panel (24, 28, 70) and the sun and controlling the flow of fluid through optional flexible heat pipes loads and unloads heat to provide thermal stability for components (62) which have special thermal requirements. An optional antenna panel (70) on a nadir side (64) of the satellite (20) offers an antenna side (74) on one surface and a thermal radiating side (72) on an opposing surface. In addition, thermal panel movements are controlled (96) to provide counter-disturbance torques (140).

22 Claims, 5 Drawing Sheets

ACTIVELY CONTROLLED THERMAL PANEL AND METHOD THEREFOR

TECHNICAL FIELD OF THE INVENTION

The present invention relates generally to the field of space vehicle control systems, and specifically to the field of satellite attitude and thermal control.

BACKGROUND OF THE INVENTION

Unnecessarily large satellites cause inefficient use of launch vehicle and satellite facilities and inefficient power management. Moreover, lack of integration among satellite systems leads to undesirable complexity. Thus, excessive payload space and power are consumed by many large, overly complex and redundant systems.

Conventional satellite thermal control systems use a satellite body panel as a primary radiative surface for the satellite. However, body panel size increases as thermal control demands increase, and increased body panel size leads to undesirably large satellites.

A trend in space vehicles, and satellites in particular, is to include an increasing multitude of diverse, complex, non-integrated systems, such as attitude control, payload, propulsion, and the like. This increasing multitude of equipment has increasing cooling requirements. Thus, using body panel size to provide cooling often causes the satellite body or bus to be undesirably large. Since launch cost depends largely on bus size, a significant portion of launch costs are due to thermal control requirements.

The use of a deployable thermal panel can increase a satellite's radiative surface area without needlessly increasing bus size. However, mere deployment of a thermal panel may yield marginal thermal performance. In particular, thermal dissipation during certain orbit positions and at certain times of the year may be undesirably poor. In fact, during some orbit positions, a conventional deployable thermal panel may produce effects opposite of those desired.

Attitude control systems control space vehicle attitude and respond to attitude errors. One cause of attitude error is disturbance torque. Disturbance torques have components about the windmill, overturning, and pitch axes, and cause attitude error which reduces the level of service provided by a satellite. For example, when attitude error of a communications satellite is not corrected, the satellite often compensates for the resultant antenna misalignment by consuming excessive power to transmit communications at higher power. In addition, disturbances due to solar, magnetic, or gravitational influences acting upon momentum wheels cause nutation, a cyclical form of attitude error which recurs at a nutation frequency throughout a satellite's orbit.

Conventional methods of damping disturbance torques involve the use of tanks or magnetic bars on-board the satellite body to slowly absorb the disturbance. However, attitude is not accurately maintained and power is wasted because the solar panels remain improperly oriented with respect to the sun. Propulsion thrusters and momentum wheels are also used to counteract disturbance torques; however, these devices have considerable mass and consume power.

Solar sailing is also used to counter disturbance torques. Unfortunately, conventional solar sailing involves positioning solar panels out of their optimum solar tracking position for as long as six orbital hours at a time. This results in cosine power loss, especially during the solstice periods of the year. Holding the solar panels away from their optimum tracking position also causes significant build-up of secular momentum and excessive variation of cyclical momentum.

Accordingly, what is needed is an actively controlled thermal panel which improves performance of a space vehicle's thermal and other systems.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE DRAWINGS

In the preferred embodiments, one or more deployable thermal panels attached to a space vehicle are actively controlled to provide thermal unloading or, if the situation requires, thermal loading. By adjusting the incident angle between the panel and the sun, these actively controlled thermal panels may provide heat absorption or heat emission to provide thermal stability for the satellite. In addition, the thermal panels may effectively perform or aid in the performance of solar sailing without the power loss conventionally associated with aiming solar panels away from the sun.

Figure 1:
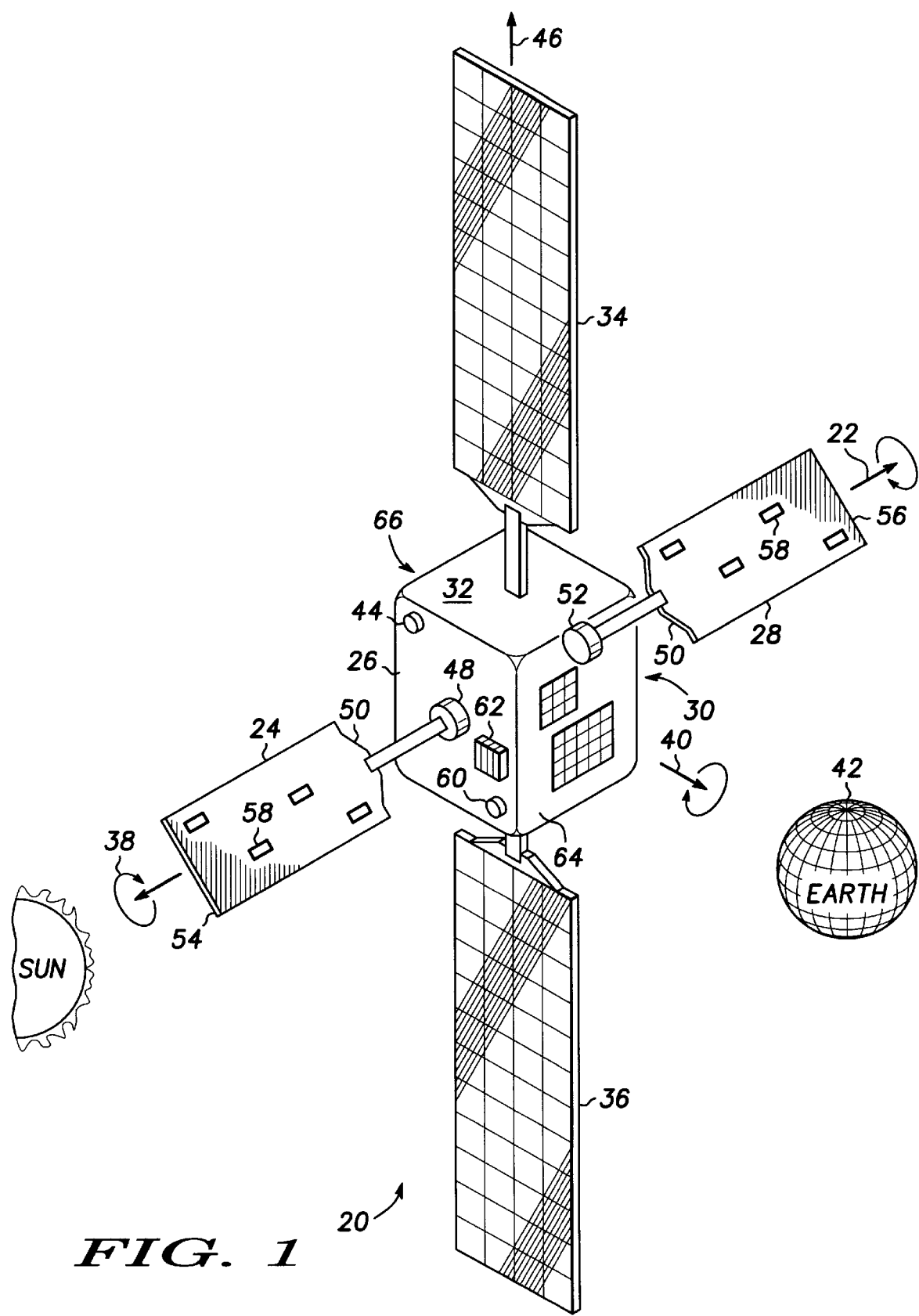
FIG. 1 shows a perspective view of a satellite having external, actively controlled thermal panels in accordance with a preferred embodiment of the present invention.

FIG. 1 shows a perspective view of a satellite 20 having external, actively controlled thermal panels 24, 28 in accordance with a preferred embodiment of the present invention. Satellite 20 resides in an earth orbit 22 and has an east thermal panel 24 mounted on an east side 26 and a west thermal panel 28 mounted on a west side 30 of a satellite bus or body 32. Satellite 20 has a north solar panel 34 and a south solar panel 36 mounted to north and south sides of satellite body 32, respectively. Satellite body 32 has a roll axis 38, which is substantially tangential to orbit 22. A yaw axis 40 of satellite body 32 is directed substantially along a line between satellite 20 and the earth 42 and is perpendicular to roll axis 38. Sensors 44 such as conventional attitude and orbit control sensors are mounted on or in satellite body 32 at conventional locations.

Solar panels 34 and 36 are conventional solar panels and can be used for solar tacking as well as for their primary purpose of generating electrical power. Solar panels 34 and 36 are elongated along a pitch axis 46, which is perpendicular to roll axis 38 and yaw axis 40.

An east panel drive unit 48 resides on east side 26 of satellite body 32 and couples an attached end 50 of east thermal panel 24 to east side 26 of satellite body 32. A west panel drive unit 52 resides on west side 30 of satellite body 32 and couples an attached end 50 of west thermal panel 28 to west side 30 of satellite body 32. East and west drive units 48 and 52 cause free ends 54 and 56 of east and west thermal panels 24 and 28, respectively, to articulate about roll axis 38 and yaw axis 40. When not tilted about yaw axis 40, east thermal panel 24 and west thermal panel 28 are elongated substantially along roll axis 38 of satellite body 32.

Heat producing electrical components 58, such as traveling wave tube amplifiers (TWTAs) or solid state power amplifiers (SSPAs) are mounted on the surfaces of thermal panels 24 and 26 in one embodiment of the present invention. One or more temperature sensors 60 on or in satellite body 32 are desirably located near electrical or other components 62 which have special thermal stability requirements. The location of temperature sensors 60 on or in satellite body 32 or on thermal panels 24 or 28 is chosen to enhance thermal stability for components 62.

In the embodiment depicted in FIG. 1, communication or other mission equipment is mounted on a nadir side 64 of satellite body 32. Generally, nadir side 64 faces the earth during an on-orbit phase of the life of satellite 20 while zenith side 66 faces away from the earth.

Figure 2:
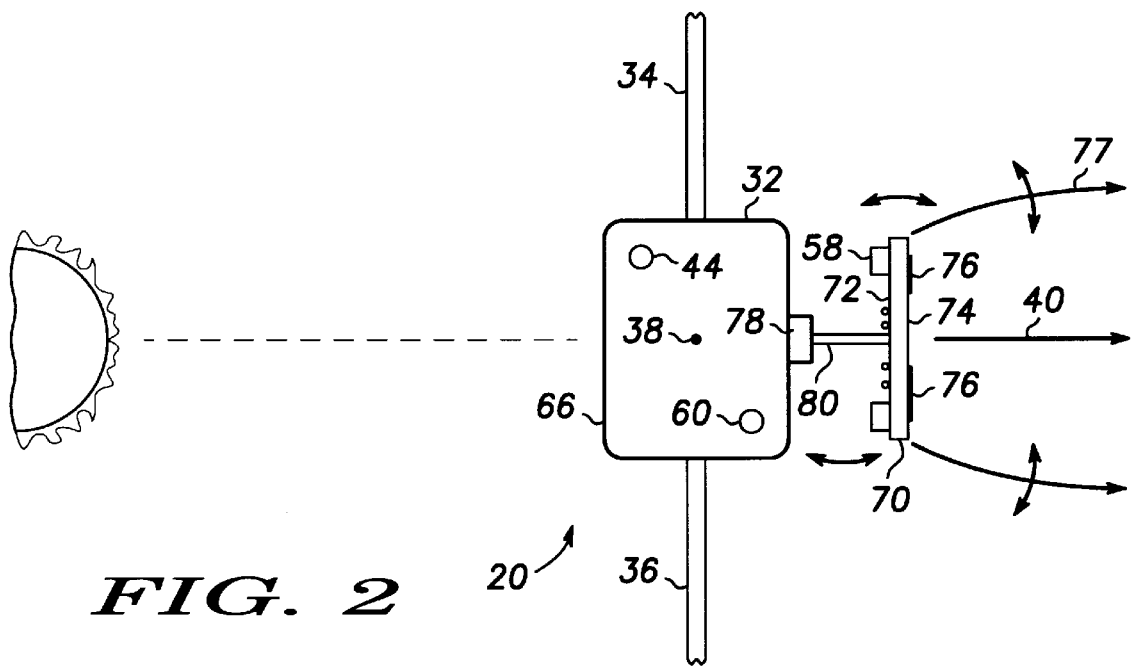
FIG. 2 shows a side view of a satellite having a thermally radiating antenna on its nadir surface in accordance with an alternate embodiment of the present invention.

FIG. 2 shows a side view of a satellite 20 having a thermally radiating antenna on its nadir surface in accordance with an alternate embodiment of the present invention. With reference to FIG. 2, satellite 20 has a zenith side 66, north and south solar panels 34 and 36, respectively, and a thermally radiating antenna 70 on nadir side 64 of satellite body 32. Zenith side 66 generally faces away from the earth during the on-orbit phase of the life of satellite 20. Roll axis 38 of satellite 20 points into the page in the side view depicted in FIG. 2.

Antenna 70 has a thermal radiating side 72 and an opposing communications radiating side 74. Heat producing electrical components 58 such as TWTAs or SSPAs can be mounted on thermal radiating side 72 of antenna panel 70. In an alternate embodiment, TWTAs or SSPAs can be mounted on a separate thermal panel 24 or 28 (FIG. 1) which mounts to nadir side 64. A communications antenna 76 may be mounted on communications radiating side 74 of panel 70. By mounting TWTAs or SSPAs 58 near communications antenna 76 in either embodiment, the length of the waveguide (not shown) between antenna 76 and TWTAs or SSPAs 58 is significantly shortened as compared to a conventional configuration. This embodiment significantly reduces electromagnetic signal absorption by the waveguide and the associated increase in power consumption. At the same time, heat dissipation for TWTAs or SSPAs 58 is removed from inside satellite body 32.

A thermal panel drive unit 78 resides on nadir side 64 of satellite body 32 and couples an attached end 80 of panel 70 to nadir side 64 of satellite body 32. Drive unit 78 causes a free end of panel 70 to articulate about one or more of roll axis 38 and yaw axis 40. When not tilted about roll axis 38, a hypothetical plane (not shown) in which panel 70 resides is substantially normal to yaw axis 40. Antenna 76 is electronically steerable by use of phase shifting arrays or other devices known to those skilled in the art. Desirably, antenna 76 is electronically steered to re-orient an antenna beam 77 to compensate for any articulation of panel 70 due to thermal or counter-disturbance torque requirements.

Figure 3:
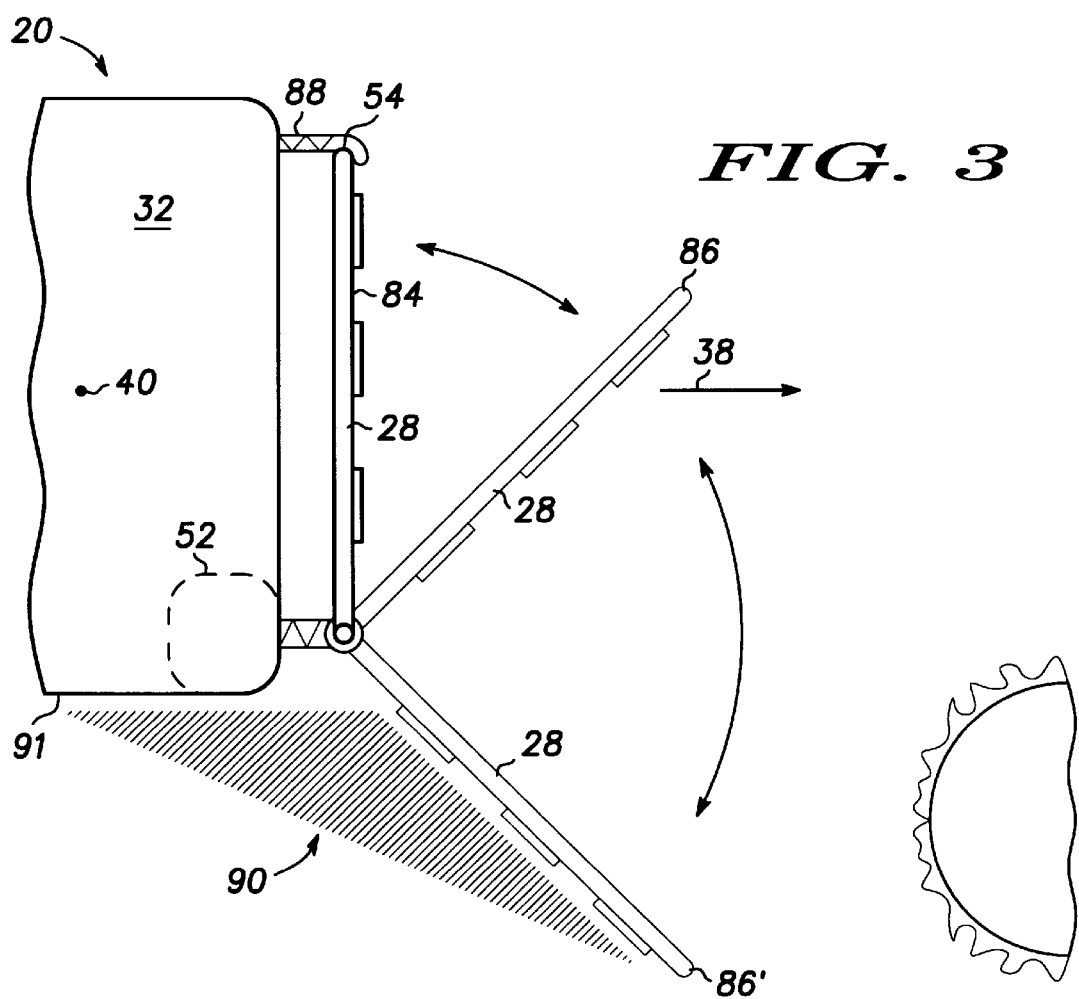
FIG. 3 shows a thermal panel in undeployed and deployed positions attached to a body surface of a satellite in accordance with a preferred embodiment of the present invention.

FIG. 3 shows a thermal panel 28 in undeployed and deployed positions attached to a body surface of a satellite in accordance with a preferred embodiment of the present invention. West thermal panel 28 is shown in an undeployed position 84 and in deployed positions 86 and 86'. Although not shown, east panel 24 (FIG. 1) and antenna panel 70 (FIG. 2) may be configured similarly to panel 28. Desirably, thermal panel 28 is stowed in undeployed position 84 during launch. Stowing panel 28 during launch saves space in the launch vehicle and makes it possible to incorporate additional similar panels into satellite 20 while allowing the use of a standard launch faring. To provide stability during launch, a launch hold-down mechanism 88 attaches free end 54 of thermal panel 28 to satellite body 32 while panel 28 is in undeployed position 84. Once operational orbit is achieved, hold-down mechanism 88 releases free end 54 of thermal panel 28 from satellite body 32 to deploy thermal panel 28. Once deployed, thermal panel 28 can articulate as commanded by panel drive unit 52 to a deployed position such as positions 86 and 86' in order to provide an active system for thermal control.

Panel drive unit 52 allows thermal panel 28 one degree of rotational freedom about yaw axis 40, which points into the page in the side view depicted in FIG. 3. Desirably, thermal panel 28 can tilt at least 90° and preferably up to 135° or more about yaw axis 40. Optionally, an additional degree of freedom about roll axis 38 may provide more active thermal control. Many conventional panel drives employing mechanisms such as a jack screw can be used to control panel 28 with one or two degrees of rotational freedom about yaw axis 40 and roll axis 38. Similar drive units are often used in connection with solar panels.

Tilting thermal panel 28 more than 90° can provide an area of shade 90 for a surface 91 of satellite body 32. This becomes useful when satellite 20 is near its ten a.m. and two p.m. orbital positions, particularly during solstice seasons when sun declination is high. When satellite 20 is near its six a.m. and six p.m. orbital positions, less movement of thermal panel 28 will achieve similar shading.

As satellite 20 orbits the earth, area of shade 90 may move correspondingly to a different portion of the surface of satellite body 32. Or, movement of thermal panel 28 may strive to maintain area of shade 90 over a particular portion of the surface of satellite body 32 as satellite 20 orbits the earth. For example, referring to FIG. 1, tilting east thermal panel 24 about yaw axis 40 while satellite 20 is near its ten a.m. orbital position shades a portion of zenith side 66 of satellite body 32. Similarly, tilting west thermal panel 28 about yaw axis 40 while satellite 20 is near its two p.m. orbital position would shade a different portion of zenith side 66 of satellite body 32. Articulation of east thermal panel 24 and west thermal panel 28 in this manner can significantly reduce the amount of time zenith side 66 of satellite body 32 is exposed to the sun.

Although not shown, an additional embodiment of the present invention has south solar panel 36 but does not have north solar panel 34, or vice versa. In this embodiment, a thermal panel similar to panels 24, 28, and 70 (FIG. 2) is attached to the north or south side of satellite body 32. This thermal panel is controlled by a thermal panel drive similar to 48, 52, and 78 (FIG. 2). This embodiment can provide excellent heat transfer characteristics by having the thermal panel attached to the north or south side of satellite body 32. In general, one or several controllable thermal panels can be attached to any surface or surfaces of satellite body 32 as long as they do not interfere with other satellite systems or mission equipment.

Figure 4:
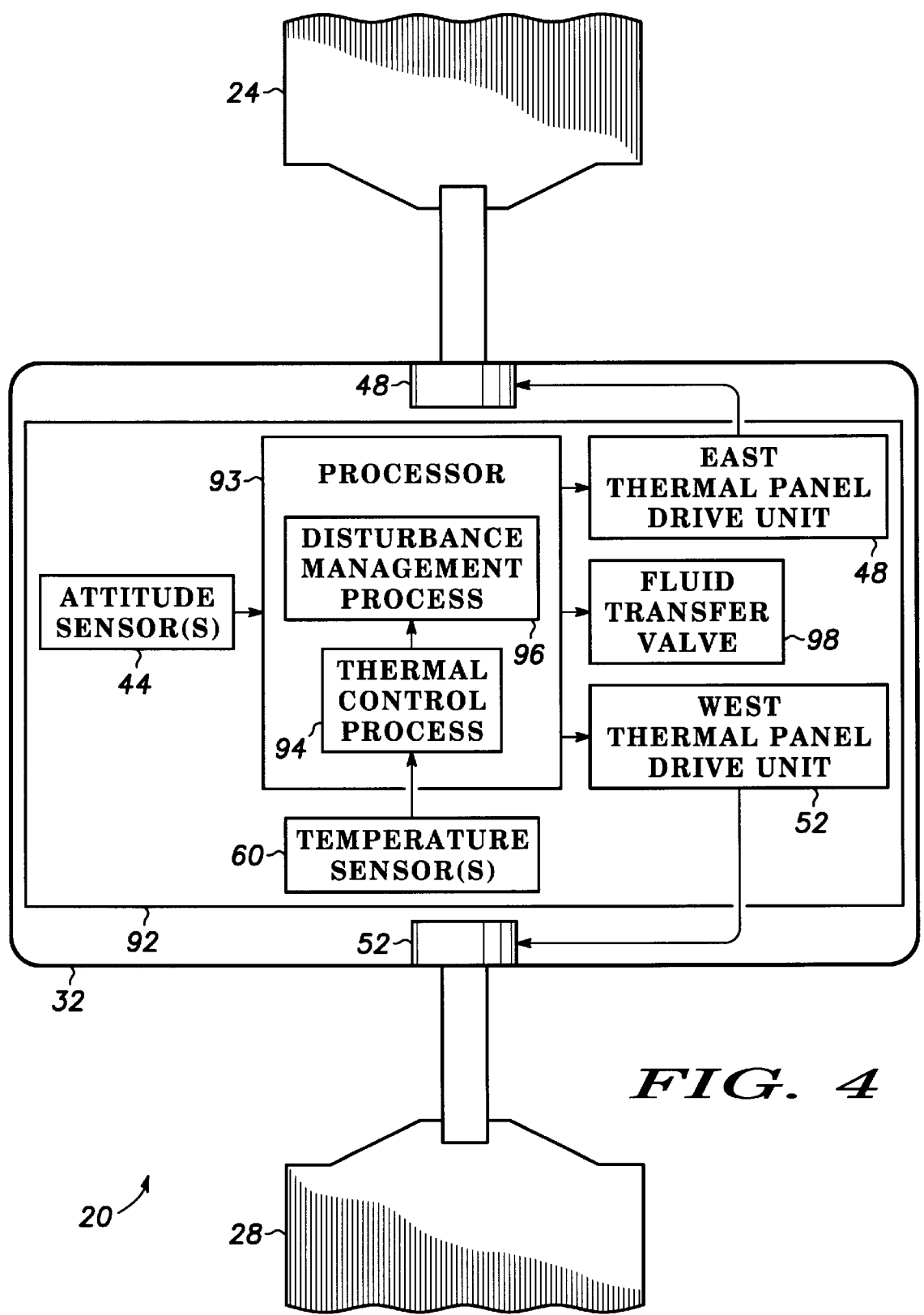
FIG. 4 shows a block diagram of a thermal control and disturbance management unit in accordance with a preferred embodiment of the present invention.

FIG. 4 shows a block diagram of a thermal control and disturbance management unit 92 in accordance with a preferred embodiment of the present invention. Thermal control and disturbance management unit 92 maneuvers thermal panels 24 and 28 to maintain thermal stability and to control disturbance torques acting on satellite 20. Attitude sensors 44 are used to detect the attitude of satellite 20. Attitude sensors 44 may include one or more earth sensors, sun sensors, GPS sensors, an inertial reference system, or other attitude sensors known in the art and conventionally found in an attitude and orbit control system. Temperature sensors 60 are used to detect a temperature in various locations within satellite body 32 or thermal panels 24, 28, and 70, as discussed above with reference to FIGS. 1 through 3. Temperature sensors 60 and attitude sensors 44 couple to a processor 93, which performs a thermal control process 94 and a disturbance management process 96. Processor 93 may be one of many on-board computers (not shown) or may represent a collection of on-board computers in data communication with one another. Moreover, processor 93 can perform many processes (not shown) in addition to thermal control process 94 and disturbance management process 96.

As described below with reference to FIG. 5, thermal control process 94 estimates the thermal characteristics of various regions of satellite 20 based on inputs from temperature sensors 60, and process 94 controls thermal panels 24 and 28 to counter excessive temperature fluctuations. Disturbance management process 96 estimates the component of satellite motion that is attributable to disturbance torque, and commands thermal panels 24 and 28 to counter the disturbance.

Referring back to FIG. 4, processor 93 couples to east thermal panel drive unit 48 and west thermal panel drive unit 52 to control east thermal panel 24 and west thermal panel 28, respectively. As discussed above, panel drive units 48 and 52 allow thermal panels 24 and 28 one degree of rotational freedom to tilt about yaw axis 40 (FIG. 1). Optionally, panel drive units 48 and 52 allow thermal panels 24 and 28 a second degree of rotational freedom to pivot about roll axis 38 (FIG. 1).

Processor 93 couples to various fluid transfer valves 98. In one embodiment of the present invention, flexible heat pipes (not shown) couple thermal panels 24, 28, and/or 70 (FIG. 2) to other parts of satellite 20. While fluid transfer valves 98 are open, a fluid flows through the flexible heat pipes to transfer heat to or from panels 24, 28, and/or 70 (FIG. 2). Fluid flows between one of thermal panels 24 and 28 and a point within or on a surface of satellite body 32 which has special thermal stability requirements. While thermal panel 24 or 28 is exposed to the sun, fluid flow provides heat loading. While thermal panel 24 or 28 points away from the sun, fluid flow provides heat unloading. Closing fluid transfer valves 98 stops coolant flow through the flexible heat pipes, thermally decoupling thermal panels 24, 28, and/or 70 (FIG. 2) from the rest of satellite 20.

Figure 5:
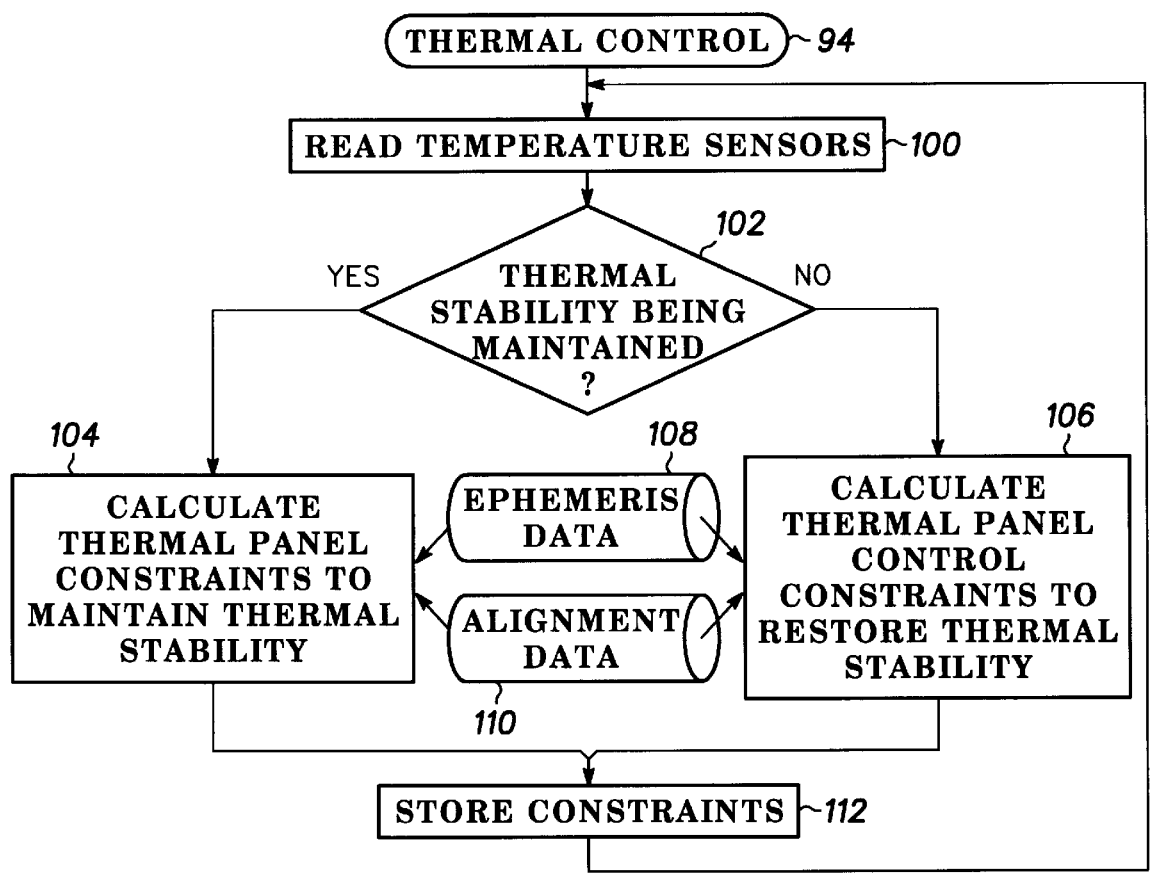
FIG. 5 shows a flow chart of a process for managing thermal control in accordance with a preferred embodiment of the present invention.

FIG. 5 shows a flow chart of a process for managing thermal control in accordance with a preferred embodiment of the present invention. The following discussion refers to items shown in FIGS. 1 through 5. Generally, thermal control process 94 monitors temperature throughout satellite 20 based on inputs from temperature sensors 60 and then commands thermal panels 24, 28, and/or 70 and fluid transfer valves 98 to counter excessive temperature fluctuation.

A task 100 reads the temperature at the points where temperature sensors 60 are located. Next, a query task 102 determines whether thermal stability is being maintained. Particularly, query task 102 determines whether certain temperature sensors 60 are indicating temperatures that are undesirably high or low. Query task 102 may make this determination by comparing sensor 60 readings with stored data on the cooling requirements of components 62.

If query task 102 determines that thermal stability is being maintained, a task 104 calculates thermal control constraints that will continue to maintain thermal stability. If query task 102 determines that thermal stability is not being maintained, a task 106 calculates thermal control constraints that will restore thermal stability.

The constraints discussed above in connection with tasks 104 and 106 set limits on the degree to which fluid transfer valves 98 can be adjusted and on the degree to which thermal panels 24, 28, and/or 70 can be tilted and pivoted.

Tasks 104 and 106 may establish the constraints based on ephemeris data 108 and on alignment data 110, which indicate the current degree to which panels 24, 28, and/or 70 are tilted and/or pivoted along with the current settings of fluid transfer valves 98. Desirably, tasks 104 and 106 determine the constraints based on average or otherwise filtered indications of thermal panel positions over a predetermined time period. This time period is related to a thermal time constant for satellite 20. Desirably, tasks 104 and 106 indicate ranges of panel movement or average panel positions which should allow thermal control process 94 to achieve its thermal stability goals.

After tasks 104 and 106, a task 112 stores the constraints calculated by tasks 104 and 106 for use by disturbance management process 96 (FIG. 4). Process 96 determines precise thermal panel movements that will achieve a desired counter-disturbance torque while meeting thermal control constraints. By applying counter-disturbance torque within the thermal control constraints, disturbance management process 96 is prevented from interfering with the thermal stability of satellite 20.

Upon completion of task 112, process flow loops back to task 100. Due to this looping back, process 94 continuously monitors temperatures indicated by sensors 60 and adjusts constraints in order to achieve its goal of thermal stability for components 62.

Figure 6:
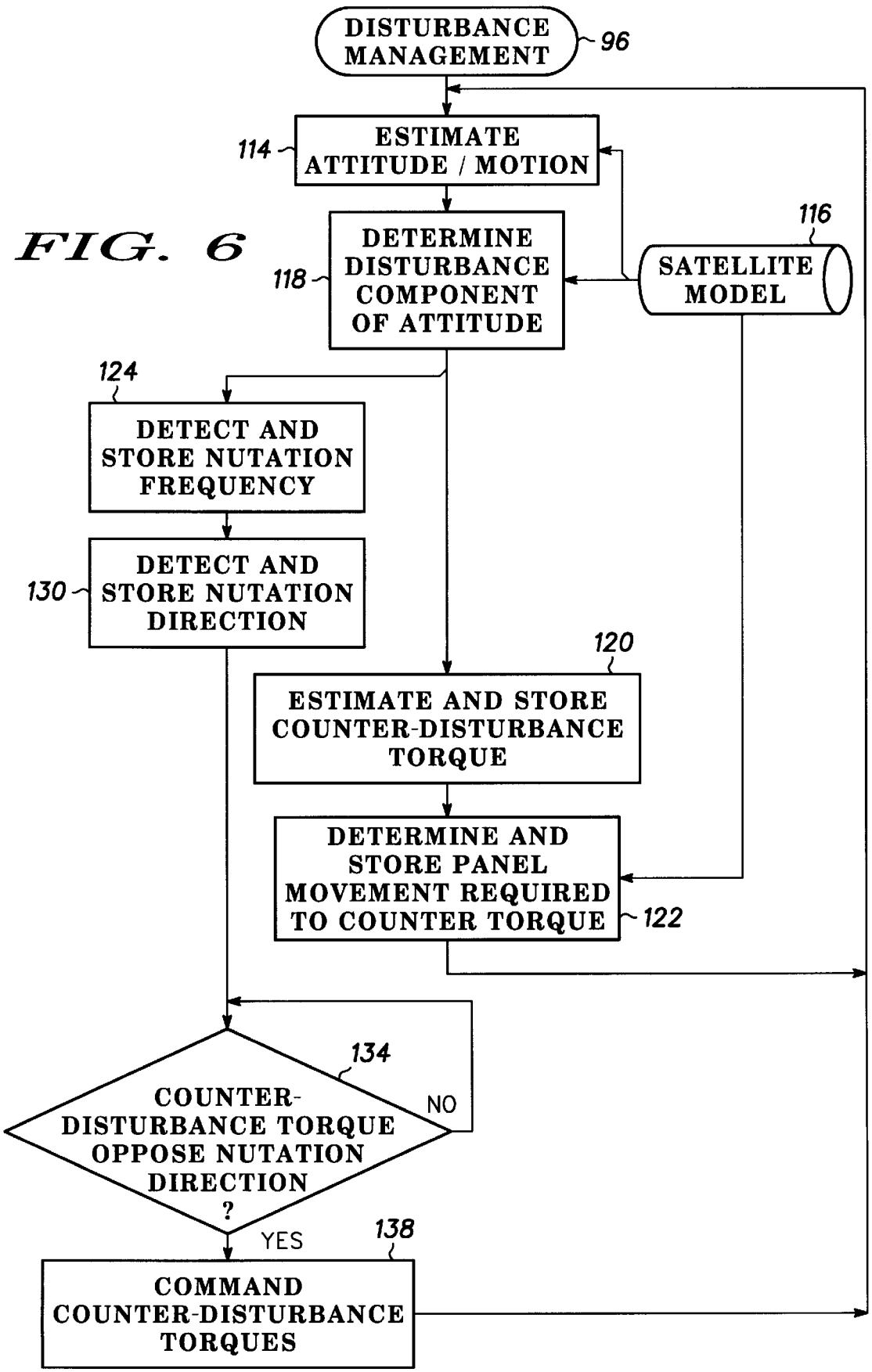
FIG. 6 shows a flow chart of a process for managing disturbance torques in accordance with a preferred embodiment of the present invention.

FIG. 6 shows a flow chart of a process for managing disturbance torques in accordance with a preferred embodiment of the present invention. The following discussion refers to items shown in FIGS. 1 through 4, and 6. Generally, disturbance management process 96 estimates the component of satellite motion attributable to disturbance torque, and then commands thermal panels 24, 28, and/or 70 to move in a manner that should counter the disturbance. Process 96 operates in a continuous loop so that continuous counter-disturbance adjustments may be made as needed to damp disturbances. By continuously making counter-disturbance adjustments, satellite 20 desirably maintains a precise desired attitude. Process 96 commands thermal panels 24, 28, and/or 70 to move within the constraints fed to process 96 by thermal control process 94. However, because of the disparity in the length of the thermal and attitude motion time constants, thermal control commands and disturbance management commands can often merge to achieve the goals of both processes 94 and 96.

A task 114 in process 96 estimates satellite attitude and motion by evaluating outputs from attitude sensors 44. Task 114 may make its satellite attitude estimates by comparing sensor outputs with outputs from an on-board simulator or a satellite model 116 which simulates satellite motions.

Disturbance-caused components of satellite motion can result from solar wind and other factors acting on satellite 20. Non-disturbance-caused components of satellite motion may be due to normal orbit movement, directed responses to thrusters, and other station keeping maneuvers.

Next, a task 118 determines the disturbance torque about each axis that is responsible for the estimated disturbance-caused components of satellite motion determined above in task 114.

Disturbance torques exert their greatest influences through external panels such as solar panels 34 and 36 and thermal panels 24, 28, and/or 70. Conventionally, such torques are described with respect to the overturning and windmill axes. The overturning and windmill axes reside in the roll/yaw plane and maintain a relatively stable orientation to the sun. Consequently, the windmill and overturning axes move with respect to roll axis 38 and yaw axis 40 as satellite 20 orbits the earth. For convenience, the following discussion uses windmill and overturning axes terminology. However, those skilled in the art will appreciate that torques and movements about the windmill and overturning axes can be translated to roll and yaw axes, and vice versa.

Task 118 may evaluate a model of satellite weight distribution data in making its determination. In other words, task 118 computes the torques that could have been experienced by satellite 20 about the windmill axis, the overturning axis, and pitch axis to cause satellite 20 to move in a manner consistent with readings from sensors 44. Factors used to calculate disturbance torque include satellite mass, weight distribution, volume, sun declination, and panel alignment. Task 118 integrates the calculations for the windmill axis, overturning axis, and pitch axis. This integration allows determination of a correct counter-disturbance torque for all axes, as described below, without causing a new disturbance torque about one axis when a counter-disturbance torque is applied solely to another axis.

After task 118, a task 120 estimates and stores the counter-disturbance torque. The counter-disturbance torque is calculated to oppose the disturbance torques satellite 20 is currently experiencing as determined above in task 118. Like disturbance torque, the counter-disturbance torque has components in the windmill axis, the overturning axis, and pitch axis, but the counter-disturbance torque is in an opposing direction to a disturbance torque. Disturbance torques can have directional components in each of the windmill axis, overturning axis, and pitch axis. A combined disturbance torque is the vector sum of disturbance torques in all three axes. The counter-disturbance torque is a torque having a direction and having components in up to all three axes. However, the counter-disturbance torque has a direction, discussed later in relation to FIG. 7, which opposes the direction of the combined disturbance torque.

After task 120, a task 122 determines and stores panel movements that will achieve the counter-disturbance torques determined above in task 120. Task 122 determines panel movements within stored constraints. The constraints come from thermal control process 94 (FIGS. 4 and 5) and represent limits to panel movement and valve adjustment that can occur without hindering thermal control. The constraints depend on orbit position. In a typical scenario, the one of thermal panels 24 and 28 which opposes the sun is not as constrained in movement as is the other of thermal panels 24 and 28 which faces the sun.

Desirably, task 122 accounts for substantially all torque components in all three axes produced directly and indirectly from the determined panel tilt and pivot so that the resultant torque vector sum of all such direct and indirect torques is the desired counter-disturbance torque.

Upon completion of task 122, process flow loops back to task 114. The looping of process flow indicates that process 96 continuously performs tasks 114, 118, 120 and 122 in the preferred embodiments throughout the on-orbit life of satellite 20.

In parallel with task 120, after task 118 a task 124 is performed. Task 124 detects a nutation frequency of satellite 20 and stores the nutation frequency for future use. Nutation represents an attitude error that repeats cyclically throughout the orbit of satellite 20. Nutation may be due to disturbances acting upon momentum wheels (not shown) located in satellite body 32.

Figure 7:
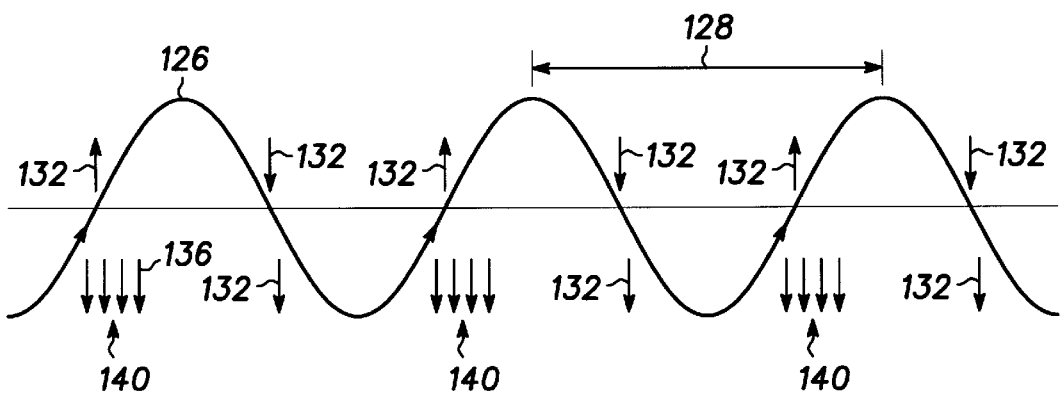
FIG. 7 shows a curve representing the application of counter-disturbance torques in a manner which damps nutation calculated in accordance with a preferred embodiment of the present invention.

FIG. 7 shows a curve representing the application of counter-disturbance torques in a manner which damps nutation calculated in accordance with a preferred embodiment of the present invention. Referring to FIGS. 6 and 7, a curve 126 depicts an exemplary one-dimensional representation of satellite nutation over time. Those skilled in the art will appreciate that two or three dimensional nutation behaves in a similar manner to that depicted in FIG. 7. A nutation period 128, which is the inverse of nutation frequency, is typically less than a few hundred seconds in most satellites. Task 124 detects the nutation frequency in response to the motion determination of task 118.

After task 124 of process 96, a task 130 detects and stores the current nutation direction 132. For the one-dimensional example depicted in FIG. 7, a nutation direction 132 may be either "upward" or "downward," depending upon the nutation phase at a given instant. In three-dimensional space, nutation is primarily a rotation or wobble around pitch axis 46. Nutation phase can be calculated as the tangent of a windmill attitude angle divided by an overturning attitude angle.

As shown in FIG. 7, a counter-disturbance torque 140 is indicated in a direction 136 opposing nutation direction 132. A query task 134 is performed by process 96 after task 130. Task 134 uses stored information to determine whether direction 136 of counter-disturbance torque 140 opposes nutation direction 132. If query task 134 determines that counter-disturbance direction 136 does not oppose nutation direction 132, process flow remains at query task 134.

However, when query task 134 determines that counter-disturbance direction 136 opposes nutation direction 132, a task 138 commands the application of counter-disturbance torques 140. Accordingly, task 134 delays the application of counter-disturbance torque 140 until direction 136 of counter-disturbance torque 140 opposes nutation direction 132. By having directions 136 and 132 oppose one another, nutation is damped rather than amplified. Those skilled in the art will recognize that although FIG. 7 indicates a "downward" counter-disturbance torque 140 direction 136 for a one dimensional example, a three-dimensional counter-disturbance torque 140 may be vectored in any direction.

Task 138 commands thermal panel drives 48, 52, and/or 78 to move thermal panels 24, 28, and/or 70. Moving thermal panels 24, 28, and/or 70 creates a counter-disturbance torque in a desired direction about yaw axis 40. Optionally, task 138 simultaneously commands thermal panel drives 48, 52, and/or 78 to rotate thermal panels 24, 28, and/or 70. Rotating thermal panels 24, 28, and/or 70 creates a counter-disturbance torque in a desired direction about roll axis 38. Desirably, the combined effect of counter-disturbance torques applied about yaw axis 40, roll axis 38, and pitch axis 46 dampens disturbances about yaw axis 40, pitch axis 46, and roll axis 38. Satellite model 116 is updated to reflect the application of counter-disturbance torque 140.

Commands resulting from thermal control process 94 in response to thermal control requirements tend to change relatively slowly, for example, according to a thermal time constant of approximately one hour. Commands resulting from disturbance management process 96 are in response to disturbance torques and nutation. Nutation is cyclical, and generally repeats according to a cycle of a few hundred seconds or less. Because of the disparity in length of the respective time cycles, commands resulting from thermal control process 94 and disturbance management process 96 do not negate or conflict with each other. In other words, disturbance management process 96 may command many thermal panel movements which address disturbance-induced attitude errors within a short period of time relative to the thermal time constant of satellite 20. The average of these movements is desirable within the constraints established through thermal control process 94.

In the preferred embodiment, only a portion of the entire counter-disturbance action may be activated during any single iteration of task 138. A single iteration of task 138 is referred to as a stage herein. Upon completion of task 138 for a given stage, process flow loops back to task 114. During subsequent stages, additional portions of the entire counter-disturbance action are activated. In other words, a given counter-disturbance action is desirably distributed in stages throughout several nutation cycles in synchronism with the nutation so that directions consistently oppose, as discussed above. In particular, the maneuvering of thermal panels is timed to occur in stages that are synchronized with nutation. This maneuvering action tends to influence rotations, such as nutation, of satellite 20 about its pitch axis 46.

FIG. 7 illustrates the application of counter-disturbance torque 140 in a pulsing manner which is suitable for operating motors within thermal panel drive units 48, 52, and/or 78 (FIGS. 1 through 3). Each pulse of counter-disturbance torque 140 may pivot and/or tilt thermal panels 24, 28, and/or 70 as needed to generate counter-disturbance torque 140. During a single stage a burst of pulses may be applied. A stream of counter-disturbance actions 140 is initiated in synchronism but out of phase with the nutation in order to dampen nutation while simultaneously compensating for disturbance torques experienced by satellite 20.

With further reference to satellite model 116 (FIG. 6), estimated attitude/motion, disturbance torque components, counter-disturbance torque 140, and nutation direction 132 and frequency 128 are fed to a simulator (not shown) within model 116. In the preferred embodiment of this invention, the simulator is a Kalman filter. The simulator receives input to identify movement commanded by task 138, and to characterize sensor readings. The simulator then simulates satellite motion which should result from a commanded movement and compares the simulated motion with actual detected motion. This comparison data is incorporated into model 116 in a manner known to those skilled in the art and used to alter modeling characteristics to influence future movements of thermal panels 24, 28, and/or 70. As the simulator progressively improves modeling of performance and movement of satellite 20, more precise movements are commanded resulting in improved satellite attitude management and enhanced satellite mission performance. As satellite 20 nears the end of its life, modeled information tracks satellite deterioration.

Disturbance management process 96 can additionally use solar panel 34 and 36 movements to aid the solar sailing counter-disturbance torques generated by moving thermal panels 24, 28, and/or 70. However, in the preferred embodiments, solar panel movements for the purpose of solar sailing are minimized. Accordingly, solar panel movements may be used primarily to track the sun as satellite 20 moves in its orbit 22 (FIG. 1). Thus, the ability of solar panels 34 and 36 to produce power can be maximized because solar panels can continually point directly at the sun.

In summary, movements of satellite thermal panels occurring in synchronized actions in one or two rotational degrees of freedom, combined with adjustments of fluid transfer valves, provide thermal control. In addition, thermal panel movements create a counter-disturbance torque in the windmill axis, overturning axis, and pitch axis. The panel movements and valve adjustments are made continuously over the course of an orbit, resulting in an active system of thermal control which leads to improved performance of a satellite's thermal system.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A space vehicle having actively controlled thermal radiating surfaces, said space vehicle comprising:

a body;

a panel drive unit attached to said body;

a thermal panel having an attached end and a free end opposing said attached end, said attached end of said thermal panel being attached to said drive unit so as to reside outside said body, wherein said thermal panel includes a communications antenna, and is configured to have a communications radiating side and a thermal radiating side opposite said communications radiating side;

a temperature sensor located on one of said body and said thermal panel; and a processor electrically coupled to said temperature sensor and to said panel drive unit, said processor being configured to command said drive unit to move said thermal panel relative to said body in response to signals received from said temperature sensor.

2. A space vehicle as claimed in claim 1 additionally comprising a heat producing electrical component mounted on said thermal panel.

3. A space vehicle as claimed in claim 1 wherein:

said space vehicle is an earth-orbiting satellite and said body has a roll axis substantially tangential to an orbit for said satellite, said roll axis extending from an east side and a west side of said body; and said drive unit and said thermal panel are located on one of said east side and said west side of said satellite so that said thermal panel is deployed from said one side and moved relative to said one side.

4. A space vehicle as claimed in claim 3 wherein, said drive unit is a first drive unit and said thermal panel is a first thermal panel, said first drive unit and said first thermal panel are located on said east side of said body, and said space vehicle additionally comprises:

a second drive unit located on said west side of said body, said second drive unit being electrically coupled to said processor; and a second thermal panel attached to said second drive unit.

5. A space vehicle as claimed in claim 3 wherein:

said space vehicle additionally comprises an attitude sensor coupled to said processor;

said processor is configured to monitor satellite motion in response to signals provided by said attitude sensor and to estimate disturbance torques experienced by said satellite; and said processor is further configured to command movement of said thermal panel relative to said body in response to said motion to generate a counter-disturbance torque.

6. A method of providing thermal control for a space vehicle having a body to which at least one external thermal panel is attached, said method comprising the steps of:

launching said space vehicle with said thermal panel in a non-deployed position in which a free end of said thermal panel resides proximate said body;

deploying said thermal panel after said space vehicle is launched by moving said free end of said thermal panel away from said body;

monitoring temperature of at least one point on said space vehicle; and moving said thermal panel relative to said body in response to said monitoring step to change said temperature at said at least one point on said space vehicles;

wherein said thermal panel includes a communications antenna, and is configured to have a communications radiating side and a thermal radiating side opposite said communications radiating side.

7. A method as claimed in claim 6 wherein:

said space vehicle is an earth-orbiting satellite and said body has a nadir side; and said method additionally comprises the step of attaching said thermal panel to said nadir side of said satellite so that said thermal panel is deployed from said nadir side and moved relative to said nadir side.

8. A method as claimed in claim 6 wherein:

said communications antenna has an antenna beam that is electronically steerable; and said method additionally comprises the step of electronically steering said antenna beam to compensate for movement of said panel.

9. A method as claimed in claim 6 additionally comprising the step of mounting a heat producing electrical component on said thermal panel.

10. A method as claimed in claim 6 wherein:

said space vehicle is an earth-orbiting satellite and said body has a roll axis substantially tangential to an orbit for said satellite, said roll axis extending from an east side and a west side of said body; and said method additionally comprises the step of attaching said thermal panel to one of said east side and said west side of said satellite so that said thermal panel is deployed from said one side and moved relative to said one side.

11. A method as claimed in claim 10 wherein said attaching step attaches a first thermal panel to said east side and attaches a second thermal panel to said west side.

12. A method as claimed in claim 10 wherein said body has a yaw axis directed substantially along a line between said satellite and the earth, and said moving step comprises the steps of:

tilting said thermal panel about said yaw axis; and pivoting said thermal panel about said roll axis.

13. A method as claimed in claim 10 wherein:

said method additionally comprises the step of monitoring satellite motion to detect disturbance torques experienced by said satellite; and said moving step additionally moves said thermal panel relative to said body in response to said motion monitoring step to generate a counter-disturbance torque.

14. A method as claimed in claim 6 wherein:

said space vehicle is an earth-orbiting satellite;

said method additionally comprises the step of monitoring satellite motion to detect disturbance torques experienced by said satellite; and said moving step additionally moves said thermal panel relative to said body in response to said motion monitoring step to generate a counter-disturbance torque.

15. A method as claimed in claim 14 wherein:

said motion monitoring step comprises the step of detecting a nutation frequency of said satellite; and said moving step comprises the step of timing said thermal panel movement to occur in synchronism with said nutation frequency.

16. A method as claimed in claim 15 wherein:

said detecting step additionally detects a nutation direction;

said moving step moves said thermal panel in a panel direction; and said method additionally comprises the step of delaying said moving step until said panel direction opposes said nutation direction so as to damp said nutation.

17. An earth-orbiting satellite having actively controlled thermal radiating surfaces which assist in solar tracking, said satellite comprising:

a body having a roll axis substantially tangential to an orbit for said satellite, said roll axis extending from an east side and a west side of said body, and having a yaw axis directed substantially along a line between said satellite and the earth;

a first panel drive unit attached to said east side of said body, said first drive unit being configured to impart tilting and pivoting rotational motions relative to said body, said tilting motion occurring about said yaw axis and said pivoting motion occurring about said roll axis;

a second panel drive unit attached to said west side of said body, said second drive unit being configured to impart said tilting and pivoting rotational motions relative to said body;

a first thermal panel attached to said first drive unit so as to reside outside said body;

a second thermal panel attached to said second drive unit so as to reside outside said body;

a temperature sensor;

an attitude sensor; and a processor electrically coupled to said temperature sensor, said attitude sensor, and to said first and second panel drive units, said processor being configured to monitor satellite motion in response to signals provided by said attitude sensor, to estimate disturbance torques experienced by said satellite, and to command said drive units to move said thermal panels in response to signals received from said temperature sensor to control satellite temperature while generating a counter-disturbance torque, said processor being further configured to detect a nutation frequency and phase of said satellite and to time said thermal panel movement to occur in synchronism with said notation frequency so as to damp nutation.

18. An earth-orbiting satellite having actively controlled thermal radiating surfaces, said satellite comprising:

a body;

a panel drive unit attached to said body;

a thermal panel having an attached end and a free end opposing said attached end, said attached end of said thermal panel being attached to said drive unit so as to reside outside said body;

a temperature sensor located on one of said body and said thermal panel; and a processor electrically coupled to said temperature sensor and to said panel drive unit, said processor being configured to command said drive unit to move said thermal panel relative to said body in response to signals received from said temperature sensor;

wherein said body has a nadir side, and said drive unit and said thermal panel are located on said nadir side of said satellite so that said thermal panel is deployed from said nadir side and moved relative to said nadir side.

19. An earth-orbiting satellite having actively controlled thermal radiating surfaces, said earth orbiting satellite comprising:

a body having a roll axis substantially tangential to an orbit for said satellite, said roll axis extending from an east side and a west side of said body, said body having a yaw axis directed substantially along a line between said satellite and the earth;

a panel drive unit attached to said body;

a thermal panel having an attached end and a free end opposing said attached end, said attached end of said thermal panel being attached to said drive unit so as to reside outside said body, said drive unit and said thermal panel being located on one of said east side and said west side of said satellite so that said thermal panel is deployed from said one side and moved relative to said one side;

a temperature sensor located on one of said body and said thermal panel; and a processor electrically coupled to said temperature sensor and to said panel drive unit, said processor being configured to command said drive unit to move said thermal panel relative to said body in response to signals received from said temperature sensor;

wherein said drive unit is configured to move said thermal panel by tilting said thermal panel about said yaw axis and by pivoting said thermal panel about said roll axis.

20. An earth orbiting satellite having actively controlled thermal radiating surfaces, said earth orbiting satellite comprising:

a body having a roll axis substantially tangential to an orbit for said satellite, said roll axis extending from an east side and a west side of said body, said body having a yaw axis directed substantially along a line between said satellite and the earth;

a panel drive unit attached to said body;

a thermal panel having an attached end and a free end opposing said attached end, said attached end of said thermal panel being attached to said drive unit so as to reside outside said body, said drive unit and said thermal panel being located on one of said east side and said west side of said satellite so that said thermal panel is deployed from said one side and moved relative to said one side;

a temperature sensor located on one of said body and said thermal panel;

a processor electrically coupled to said temperature sensor and to said panel drive unit, said processor being configured to command said drive unit to move said thermal panel relative to said body in response to signals received from said temperature sensor; and an attitude sensor coupled to said processor;

wherein said processor is configured to monitor satellite motion in response to signals provided by said attitude sensor and to estimate disturbance torques experienced by said satellite, and is further configured to command movement of said thermal panel relative to said body in response to said motion to generate a counter-disturbance torque, and said drive unit is configured to tilt said thermal panel about said yaw axis over a range of greater than 45° and to pivot said thermal panel about said roll axis over a range of greater than 90° to generate said counter-disturbance torque.

21. A method of providing thermal control for an earth-orbiting satellite having a body to which at least one external thermal panel is attached, said body having a roll axis substantially tangential to an orbit for said satellite, said roll axis extending from an east side and a west side of said body, said body having a yaw axis directed substantially along a line between said satellite and the earth, said method comprising the steps of:

launching said satellite with said thermal panel in a non-deployed position in which a free end of said thermal panel resides proximate said body;

deploying said thermal panel after said satellite is launched by moving said free end of said thermal panel away from said body;

attaching said thermal panel to one of said east side and said west side of said satellite so that said thermal panel is deployed from said one side and moved relative to said one side;

monitoring temperature of at least one point on said satellite;

moving said thermal panel relative to said body in response to said temperature monitoring step to change said temperature at said at least one point on said satellite;

monitoring satellite motion to detect disturbance torques experienced by said satellite; and in response to said motion monitoring step, tilting said thermal panel about said yaw axis over a range of greater than 45° to generate a counter-disturbance torque, and pivoting said thermal panel about said roll axis over a range of greater than 90° to generate said counter-disturbance torque.

22. A method of providing thermal control for an earth orbiting satellite having a body to which at least one external thermal panel is attached, said body having a roll axis substantially tangential to an orbit for said satellite, said roll axis extending from an east side and a west side of said body, said body having a yaw axis directed substantially along a line between said satellite and the earth, said method comprising the steps of:

launching said satellite with said thermal panel in a non-deployed position in which a free end of said thermal panel resides proximate said body;

deploying said thermal panel after said satellite is launched by moving said free end of said thermal panel away from said body;

attaching said thermal panel to one of said east side and said west side of said satellite so that said thermal panel is deployed from said one side and moved relative to said one side;

monitoring temperature of at least one point on said satellite; and moving said thermal panel relative to said body in response to said monitoring step to change said temperature at said at least one point on said satellite, said moving step comprising the step of tilting said thermal panel about said yaw axis away from said one side over a range of greater than 90°.

* * * * *